(12) United States Patent
Tagliavia et al.

(10) Patent No.: US 9,893,614 B2
(45) Date of Patent: Feb. 13, 2018

(54) DEVICE AND METHOD FOR CONTROLLING A VOLTAGE REGULATOR AND CORRESPONDING VOLTAGE REGULATOR

(71) Applicant: STMICROELECTRONICS S.R.L., Agrate Brianza (IT)

(72) Inventors: Donato Tagliavia, Acireale (IT); Calogero Andrea Trecarichi, Aci Catena (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 15 days.

(21) Appl. No.: 14/970,836

(22) Filed: Dec. 16, 2015

(65) Prior Publication Data

US 2016/0352222 A1 Dec. 1, 2016

(30) Foreign Application Priority Data

May 27, 2015 (IT) .................. 102015000018371

(51) Int. Cl.
*H02M 3/156* (2006.01)
*H02M 1/32* (2007.01)
*H02M 3/155* (2006.01)
*H02M 3/157* (2006.01)
*H02M 1/00* (2006.01)

(52) U.S. Cl.
CPC ............. *H02M 3/156* (2013.01); *H02M 1/32* (2013.01); *H02M 3/155* (2013.01); *H02M 3/157* (2013.01); *H02M 2001/0009* (2013.01); *H02M 2001/325* (2013.01)

(58) Field of Classification Search
CPC ...... H02M 1/32; H02M 3/156; H02M 3/1563; H02M 3/157; H02M 3/158; H02M 3/1588
See application file for complete search history.

(56) References Cited

U.S. PATENT DOCUMENTS

| 7,541,795 | B1* | 6/2009 | Smith | ................. H02M 1/32 323/283 |
| 7,558,093 | B1* | 7/2009 | Zheng | ............. H02M 3/33515 363/21.12 |
| 2006/0022731 | A1* | 2/2006 | Leung | ................. H03K 7/08 327/172 |
| 2007/0008748 | A1* | 1/2007 | Tang | .................. H02M 3/156 363/21.12 |

(Continued)

*Primary Examiner* — Fred E Finch, III
(74) *Attorney, Agent, or Firm* — Slater Matsil, LLP

(57) ABSTRACT

A method includes generating a control signal for controlling a switch element, and determining at each switching cycle alternation of an ON interval with storage of energy in the inductor element starting from an input voltage, and an OFF interval with transfer of the energy stored in an inductor element into a storage element on which an output voltage is present. The method includes when the inductor current reaches the first threshold value before the end of a first interval, determining the end of the ON interval at the end of the first interval. The method includes following detection of the ON interval having a duration equal to the first interval, the detection being indicative of a possible short-circuit condition at output, determining the OFF interval having a second duration equal to a lengthened interval longer than the first duration.

27 Claims, 8 Drawing Sheets

(56) References Cited

U.S. PATENT DOCUMENTS

| | | | | |
|---|---|---|---|---|
| 2008/0239764 A1* | 10/2008 | Jacques | ................... | H02M 1/32 |
| | | | | 363/21.04 |
| 2010/0008106 A1 | 1/2010 | Kawabe et al. | | |
| 2011/0058285 A1* | 3/2011 | Wibben | ................... | H02M 1/32 |
| | | | | 361/18 |
| 2011/0062932 A1* | 3/2011 | Hawkes | ................ | H02M 3/156 |
| | | | | 323/288 |
| 2011/0101946 A1* | 5/2011 | Nguyen | ................ | H02M 3/158 |
| | | | | 323/282 |
| 2011/0291634 A1* | 12/2011 | Takata | .................... | H02M 1/32 |
| | | | | 323/285 |
| 2012/0032660 A1 | 2/2012 | Nakamura | | |
| 2012/0286754 A1* | 11/2012 | Chen | ................... | H02M 3/1588 |
| | | | | 323/284 |
| 2013/0058138 A1 | 3/2013 | Djenguerian et al. | | |
| 2014/0077782 A1* | 3/2014 | Cortigiani | .......... | H03K 17/0822 |
| | | | | 323/284 |
| 2014/0159695 A1* | 6/2014 | Jin | ........................ | H02M 3/156 |
| | | | | 323/288 |
| 2016/0226375 A1* | 8/2016 | Phadke | ................... | H02M 3/04 |

* cited by examiner

DEVICE AND METHOD FOR CONTROLLING A VOLTAGE REGULATOR AND CORRESPONDING VOLTAGE REGULATOR

RELATED APPLICATION

This application is based upon prior filed copending Italian Application No. 102015000018371 filed May 27, 2015, the entire subject matter of which is incorporated herein by reference in its entirety.

TECHNICAL FIELD

The present disclosure relates to a device and a method for controlling a voltage regulator.

BACKGROUND

Voltage regulators may operate in a switched-mode. These voltage regulators are designed to convert a quantity received at an input, for example, a direct current (DC) voltage coming from a supply source, for example, a battery or a voltage-boosting device, into a regulated output quantity, for example, a DC voltage having a reduced or increased value (according to the type of voltage regulator), for supplying an electrical load. For example, the load may comprise a light-emitting diode (LED) or a group of LEDs.

SUMMARY

Generally speaking, a method may include generating a control signal for controlling a switch element, and determining at each switching cycle alternation of an ON interval with storage of energy in the inductor element starting from an input voltage, and an OFF interval with transfer of the energy stored in an inductor element into a storage element on which an output voltage is present. The method may include determining an end of the ON interval based upon a comparison between an inductor current that passes through the inductor element and a first threshold value, and determining a first duration of the OFF interval, and when the inductor current reaches the first threshold value before the end of a first interval, determining the end of the ON interval at the end of the first interval. The method may include following detection of the ON interval having a duration equal to the first interval, the detection being indicative of a possible short-circuit condition at output, determining the OFF interval having a second duration equal to a lengthened interval longer than the first duration.

DETAILED DESCRIPTION

In particular, the following discussion will make explicit reference, without this implying any loss of generality, to a DC/DC voltage regulator of a buck type. It is emphasized, however, that what will be described may apply in a similar manner to other types of voltage regulators, for example, buck-boost, boost, or flyback regulators.

Figure 1:
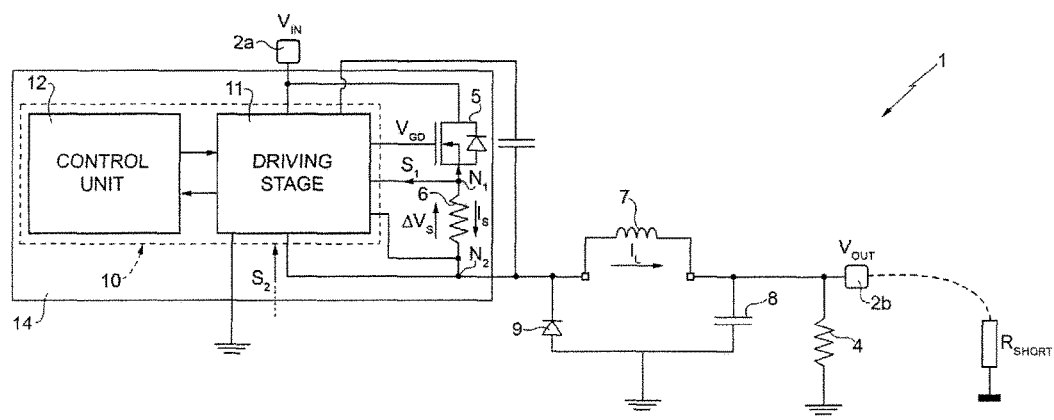
FIG. 1 is a schematic circuit diagram of a voltage regulator and an associated control device, according to the prior art.

In a typical approach, and as illustrated in FIG. 1, a voltage regulator 1, in the example of a buck type, has an input terminal 2a, which receives an input voltage $V_{in}$, for example, a DC voltage having a first value (a boosted value, coming for example from a charge pump), and an output terminal 2b, on which it supplies an output voltage $V_{out}$, in the example a DC voltage having a second value lower than the first value, to a load, here schematically represented by a load resistor 4.

The voltage regulator 1 comprises: a switch element 5, in particular a power metal-oxide semiconductor field effect transistor (MOSFET), coupled between the input terminal 2a and a first internal node N1; a sensing resistor 6, coupled between the first internal node N1 and a second internal node N2; an inductor 7, coupled between the second internal node N2 and the output terminal 2b; an output capacitor 8, coupled between the output terminal 2b and a reference or ground terminal GND; and a recirculation diode 9, having its anode coupled to the ground terminal GND and its cathode coupled to the second internal node N2. In greater detail, the switch element 5 has a first current-conduction terminal, in particular, the drain terminal of the respective MOSFET, coupled to the input terminal 2a, a second current-conduction terminal, in particular the source terminal of the respective MOSFET, coupled to the first internal node N1, and a control terminal, i.e. the gate terminal of the respective MOSFET.

The voltage regulator 1 further comprises a control device 10, designed to generate a control signal VGS for controlling switching of the switch element 5 in pulse-width modulation (PWM), and thus regulate the value of the output voltage Vout around a desired value (as described in more details hereinafter). The control signal VGS, constituted by a pulse train with period and duty-cycle that are a function of the control action, is supplied to the gate terminal of the MOSFET that provides the switch element 5.

In particular, the control device 10 receives at input a first feedback signal S1, indicative of a current IS that flows in the sensing resistor 6 (and thus of the voltage drop LVs across the same sensing resistor 6), and a second feedback signal S2, indicative of the value of the output voltage Vout (in a way not illustrated in FIG. 1, the feedback signal S2 is, for example, obtained from the output voltage Vout with a resistive divider). The control device 10 comprises: a driving stage 11, designed to generate the control signal VGS; and a control unit 12, designed to implement an appropriate algorithm for control generation, by the driving stage 11, of the control signal VGS, on the basis of the first and second feedback signals S1, S2.

In a possible embodiment, as shown in FIG. 1, the control device 10 is provided as an integrated circuit (i.e. a chip) 14, and has a package and corresponding input and output pins. The integrated circuit may be mounted on a same printed-circuit board (PCB) with the remaining circuit components that provide the voltage regulator 1, in particular, the inductor 7 and the output capacitor 8. In the illustrated embodiment, the switch element 5 and the sensing resistor 6 are also provided in an integrated manner within the same integrated circuit 14. However, it may also be envisioned that the switch element 5 and sensing resistor 6 are provided externally to the integrated circuit 14 of the control device 10.

At each switching cycle (i.e., at each period of the control signal VGS), the control device 10 drives closing of the switch element 5 for an ON interval Ton (ON interval of the duty-cycle), during which a linearly increasing inductor current IL circulates through the inductor 7, charging the output capacitor 8. The inductor current IL is monitored by the control device 10 via the first feedback signal S1. When the first feedback signal S1 reaches an upper threshold pre-set by the control loop, which is a function of the difference (or error) between the value of the output voltage Vout (monitored by way of the second feedback signal S2) and an internal reference voltage, the control unit 12 drives, through the driving stage 11, opening of the switch element 5, thus starting the OFF interval Toff (OFF interval of the duty-cycle).

The inductor current IL thus decreases linearly from a maximum, peak, value IL_PEAK reached at the end of the ON interval Ton as far as a minimum, valley, value IL_val reached at the end of the OFF interval Toff. In particular, subsequent closing of the switch element 5 (and start of the ON period Ton of the next switching cycle) may be determined by the control device 10 with various control algorithms. For example, control may be performed at a constant switching frequency, with the end of the OFF interval Toff synchronized by a clock signal, or else it may be at a variable frequency, with a constant duration of the OFF interval Toff (or else the ON interval Ton could likewise be constant), or again a control could be envisioned where the product Vout-Toff between the output voltage Vout and the duration of the OFF interval Toff will be kept constant.

In any case, irrespective of the particular control algorithm implemented, the control logic envisions that, after closing of the switch element 5, the duration of the ON interval Ton may not be less than an appropriate value that may not be equal to zero (hereinafter referred to as minimum interval Ton_MIN). In other words, a blanking interval is implemented, within which possible events that would otherwise determine start of the subsequent OFF interval Toff (on the basis of the control algorithm implemented—in the example, crossing of the upper threshold by the inductor current IL) are neglected. The blanking-time interval is implemented in so far as the information associated to the first feedback signal S1 (supplied by the sensing resistor 6) may not be considered reliable during the same time interval.

Such a control approach has some drawbacks, in particular, in the case where a short-circuit at output, i.e., on the output terminal 2b, occurs. In FIG. 1, this short-circuit is represented by a short-circuit resistance RSHORT in parallel to the load resistance 4. In this case, during the ON interval Ton the inductor current IL that circulates in the inductor 7 increases with the maximum slope possible (given that the output voltage Vout is zero or close to zero), being able to reach the peak value IL_PEAK in a time interval shorter than the minimum interval Ton_MIN.

Furthermore, in this same short-circuit condition, the inductor 7 discharges with a slope close to zero, given by (Vout+Vf)/L, where the value of the output voltage Vout is close to zero, on account of the short-circuit, Vf is the voltage drop across the recirculation diode 9 in a conduction condition (having a low value, given that normally the recirculation diode 9 is of a Schottky type), and L is the inductance of the inductor 7. Consequently, given that the switch element 5 may not in any case be OFF before the end of the minimum interval Ton_MIN and that discharging takes place very slowly, the inductor current IL may reach values even much higher than the expected peak value IL_PEAK, even only after a limited number of switching cycles, with consequent possible damage to the voltage regulator 1 and in particular to the inductor 7.

To overcome this problem, and prevent damage to the components of the system, a possible approach may comprise setting a second threshold current, higher than the maximum peak current IL_PEAK that the application envisions in normal operating conditions for the inductor current IL. When this second threshold current is reached, the control device 10 may force the voltage regulator 1 off. This approach intervenes, however, only after the inductor current IL has reached the second current threshold, i.e., when the inductor current IL has potentially destructive values, without thus being able to prevent such an event from occurring.

The disadvantage of this approach thus lies in the fact that, on account of inevitable delays in the control chain of the system between the moment of detection of the short-circuit condition and the instant of effective turning-off of the voltage regulator 1, the inductor current IL may reach levels even significantly higher than the second current threshold. In particular, the inductor current IL may even exceed the point of saturation of the inductor 7, giving rise to a further sudden increase of the current, the latter being, in this case, limited only by the series resistance of the inductor 7. A further drawback of the approach is represented by the fact that the inductor 7 has consequently to be sized for values of the saturation level current significantly above the maximum peak current envisioned in normal operating conditions, with a consequent considerable increase of costs and of the dimensions of the same inductor 7.

A further approach may envision monitoring of the output voltage Vout and comparison of its value with a "relatively" low reference voltage indicative of a short-circuit condition. When the output voltage Vout becomes lower than the reference voltage, a short-circuit event is detected and, for example, the voltage regulator 1 is turned off. The disadvantages of the above approach are similar to those of the previous approach, as regards to the fact that the effects of short-circuit may in any case occur, on account of the inevitable delays of the control chain, so that it is not possible to prevent possible damage to the system. Furthermore, the above approach does not enable with complete certainty detection of short-circuits of the so-called resistive type or that in any case entail a value of the output voltage Vout higher than the reference voltage chosen for detection.

The aim of the present disclosure is in general to solve the problems highlighted previously. According to the present disclosure, a device and a method for control of a voltage regulator, as well as a corresponding voltage regulator, are disclosed. As will be discussed in detail in the following, one aspect of the present approach envisions that the control device of the voltage regulator is configured to prevent damage to the same voltage regulator, and in particular to prevent the inductor current $I_L$ from reaching high and potentially harmful values.

For this purpose, the control device is configured to monitor the duration of the ON interval Ton, and in the case where it detects that the duration is equal to the minimum interval Ton_MIN (associated to the blanking interval), this being a condition potentially indicative of a short-circuit at the output, to lengthen the duration of the subsequent OFF interval Toff to an appropriate lengthened value Toff_LONG, such as to enable an adequate discharge of the inductor and an adequate decrease of the inductor current IL before start of the next switching cycle.

Advantageously, the lengthened value Toff_LONG is determined on the basis of the output voltage Vout (and thus of the short-circuit resistance RSHORT) and in such a way that the value of the discharge current during the OFF interval Toff is higher than or equal to the charge current accumulated during the previous ON interval Ton, so that the inductor current IL will not increase from one switching cycle to the next, thus preventing the same current from reaching the saturation value.

A further aspect of the present approach envisions that the control device is further configured to discriminate between a temporary (or non-effective) short-circuit condition, following upon which it is possible to return to the normal algorithm for control of the voltage regulator, and a permanent (or effective) short-circuit condition, following upon which, instead, it is required to turn-off the same voltage regulator, in order to prevent damage thereto.

In particular, the control device will determine for this purpose, by way of a short-circuit counter, a maximum number N of consecutive switching cycles in which the ON interval Ton has a duration equal to the minimum interval Ton_MIN, after which the voltage regulator is to be turned off.

As will be discussed in detail, the control device is further designed to manage particular situations, amongst which an intermittent short-circuit and a start-up transient. In particular, in the case where it determines a certain number M of consecutive switching cycles in which the ON interval Ton has a duration longer than the minimum interval Ton_MIN, the control device resets the short-circuit counter.

The number M, like the number N, is selected appropriately in order to prevent false detections of short-circuits in normal operating conditions and at the same time to detect also short-circuits that do not present immediately and/or in a continuous manner ON intervals Ton of minimum duration (for example, on account of a high inductance value of inductor 7). Furthermore, in a start-up phase of the voltage regulator, where the output capacitor is discharged, counting of the switching cycles with ON interval Ton of minimum duration may be inhibited for an appropriate time interval in order to reduce the risk of false detection of short-circuits. In any case, after each ON interval Ton of minimum duration, the OFF interval Toff with lengthened duration is applied, the value of which is updated from one switching cycle to the next (and possibly within a same switching cycle), as a function of possible variations of the output voltage Vout, until the same output voltage Vout reaches a value of equilibrium.

Figure 2:
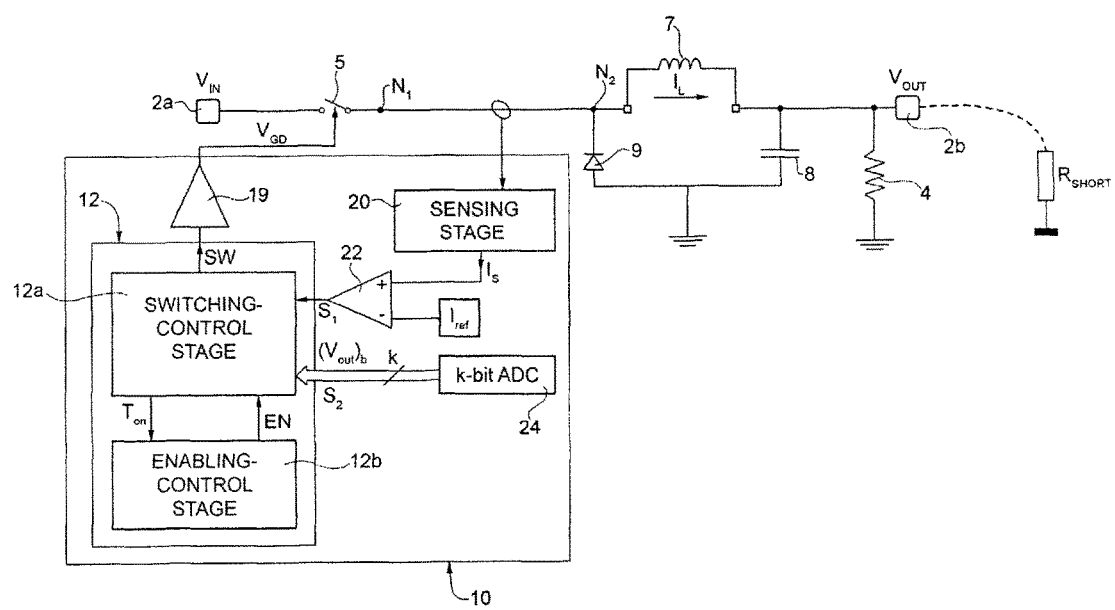
FIG. 2 is a schematic circuit diagram of a voltage regulator and an associated control device, according to the present disclosure.

With reference to FIG. 2 (where same reference numbers are used for designating elements corresponding to others already described previously with reference to FIG. 1), an embodiment of a control device is now described, once again designated by 10, for a voltage regulator, once again designated by 1, for example of the buck type (it is again emphasized, however, that what is illustrated herein finds advantageous application also in other types of regulators).

The voltage regulator 1 has a configuration similar to what has been described with reference to FIG. 1, and is not here described again in detail. For reasons of simplicity of illustration, a sensing stage 20 is shown schematically in FIG. 2, coupled between the first internal node N1 and the second internal node N2 and designed to provide detection of the current IS circulating towards the inductor 7 (the sensing stage 20 may, for example, be provided by the sensing resistor 6 of FIG. 1, or with some other sensing methodology of a per se known type). The switch element 5 is also shown schematically (it possibly being obtained, as illustrated in FIG. 1, by a power MOSFET, or with some other equivalent known power device).

In particular, the control device 10 comprises, as illustrated previously: the driving stage 11 designed to generate the control signal VGS for the switch element 5; and the control unit 12, for example provided by way of a microprocessor, a microcontroller, a Digital Signal Processor (DSP), a Field-Programmable Gate Array (FPGA) or some such computing and processing element implementing appropriate programming instructions, which has a non-volatile memory and is designed to implement a suitable algorithm for controlling the driving stage 11 in generation of the control signal VGS on the basis of the first and second feedback signals S1, S2.

In this embodiment, the first feedback signal S1 is generated by a comparator 22, which has a first input coupled to the output of the sensing stage 20 and receives the detection of current IS, and a second input which receives a reference current Iref, for example, having a value correlated to a desired peak value IL_PEAK for the inductor current IL that circulates within the inductor 7 in normal operating conditions. The control approach includes in fact in this case a regulation of the output current, given by:

$$I_{out} = I_{L\_PEAK} - (V_{out} \cdot T_{off})/2L;$$

however, control approaches that envision a regulation of the output voltage $V_{out}$ are likewise possible, as will be evident to a skilled person.

The first feedback signal S1 in this case has a first value, for example, high, in the case where the detected value of current IS is equal to or higher than the reference current Iref and in particular equal to or higher than the peak value IL_PEAK. Furthermore, second feedback signal S2 is supplied by a k-bit analog-to-digital (A/D) converter stage 24, which receives at input the output voltage Vout and supplies a digital version of the same output voltage (Vout)b. The second feedback signal S2 thus each time indicates the current value of the same output voltage Vout.

In the embodiment illustrated, the control unit 12 of the control device 10 comprises: a switching-control stage 12a, which generates, as a function of the first and second feedback signals S1, S2, a switching-control signal SW for the driving stage 11, on the basis of which the driving stage 11 generates the control signal VGS (in particular, a first value, for example, high or '1', of the switching-control signal SW determines closing of the switch element 5 and thus start of the ON interval Ton, whereas a second value, for example, low or '0', of the switching-control signal SW determines opening of the switch element 5 and thus end of the ON interval Ton and start of the OFF interval Toff). The control unit 12 includes: and an enabling-control stage 12b, which receives, at each switching cycle, from the switching-control stage 12a information on the duration of the ON interval Ton, and is configured to monitor this duration for determining a short-circuit condition on the output and to generate an enable signal EN for the switching-control stage 12a, which is designed to enable (with a first value thereof, for example high or '1') or disable (with a second value thereof, in the example low or '0') operation of the voltage regulator 1, i.e., to turn-on or turn-off the same voltage regulator 1.

The switching-control stage 12a and the enabling-control stage 12b operate in parallel, exchanging the required information (in particular, the duration of the ON interval Ton and the enable signal EN) so as to implement real-time control of the voltage regulator 1. In a possible embodiment, the switching-control stage 12a and the enabling-control stage 12b are implemented by means of respective finite-state machines (FSMs) operating on the basis of a common timing signal.

Figure 3A:
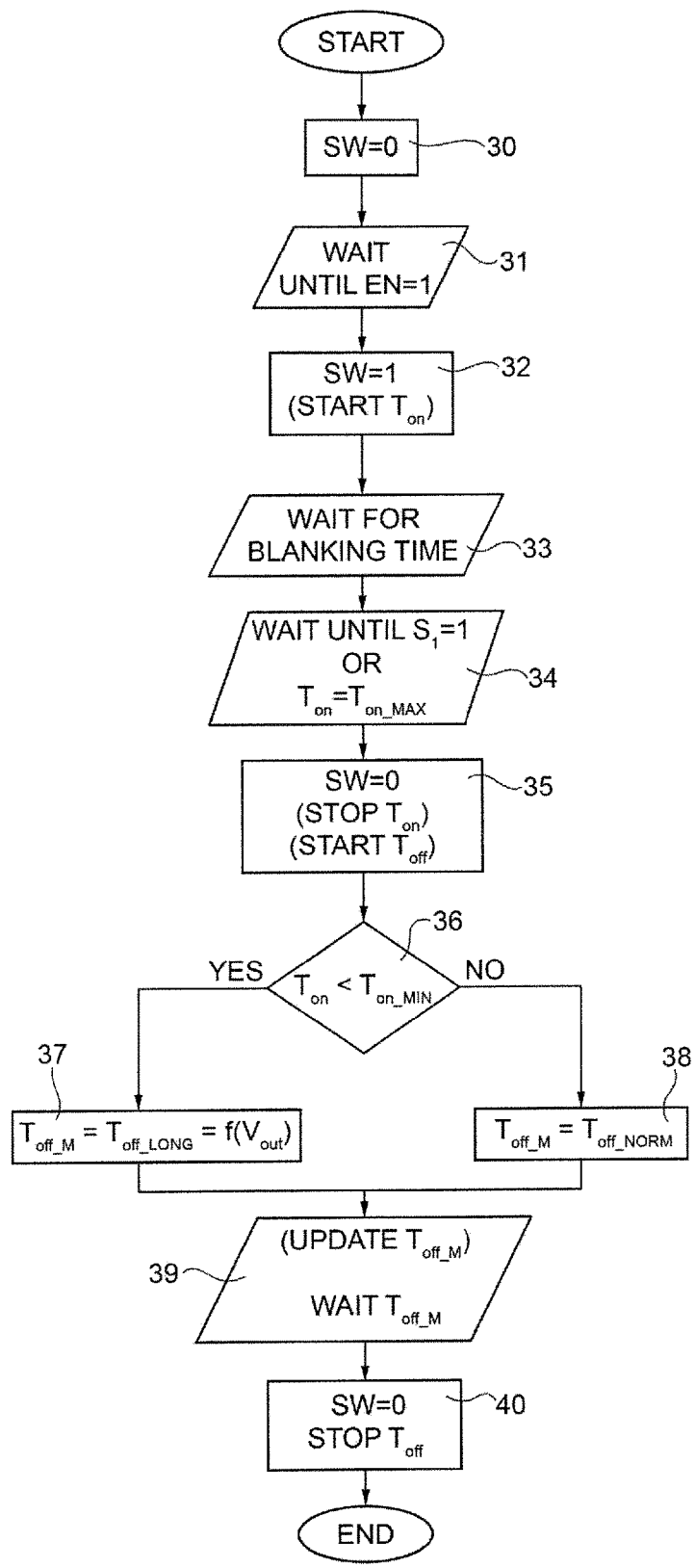
FIGS. 3A and 3B are flowcharts regarding control operations performed by the control device of FIG. 2.

With reference to FIG. 3A, the operations executed by the switching-control stage 12a of the control unit 12 are now described for one switching cycle. Initially (step 30), the switching-control signal SW is assumed as being low ('0'). In the next step (step 31), the switching-control stage 12a verifies that the enable signal EN supplied by the enabling-control stage 12b is equal to '1' (or waits for the enable signal EN to assume the high value).

Next (step 32), when the switching-control signal SW becomes equal to '1' (as a result of the control algorithm implemented, as discussed in detail previously), the switching-control stage 12a consequently activates a first time counter for measurement of the duration of the ON interval Ton (this duration corresponding to the time between the rising edge and the subsequent falling edge of the switching-control signal SW). The switching-control stage 12a thus waits (step 33), for the blanking interval, equal to the minimum interval Ton_MIN, to elapse.

Then (step 34), it waits for one of the following two conditions to arise: the first feedback signal S1 goes to a high value, '1', for example, indicating the fact that the inductor current IL has reached the pre-set maximum peak value IL_PEAK (it is to be noted that, in the short-circuit condition, the first feedback signal S1 is high immediately at the end of the minimum interval Ton_MIN); or the duration of the ON interval Ton assumes a maximum value Ton_MAX, so as to guarantee end of the ON interval Ton after a pre-set interval also in the case where the inductor current IL has not in the mean time reached the peak value IL_PEAK; this situation may, for example, occur in the case of the load being discoupled, the so-called "open load" condition. Next, in step 35, the switching-control signal SW thus switches to the low value '0', terminates counting of the duration of ON interval Ton and starts the count of the duration of OFF interval Toff.

In step 36, the switching-control stage 12a compares the duration measured for the previous ON interval Ton with the minimum interval Ton_MIN, so as to determine a maximum duration Toff_M, possibly appropriately lengthened, which has to be assigned to OFF interval Toff. In particular, in the case where the duration of the ON interval Ton is shorter than or equal to the minimum interval Ton_MIN, a condition potentially indicative of a short-circuit at output, in step 37 the maximum duration Toff_M of the OFF interval Toff is set equal to the lengthened interval Toff_LONG, the value of which is determined in real time, as will be described in detail hereinafter, as a function, among other parameters, of the value of the output voltage Vout (monitored via the second feedback signal S2).

In the case, instead, where the duration of the ON interval Ton is longer than the minimum interval Ton_MIN, which is a condition potentially indicative of a normal operation (i.e., not a short-circuit condition), in step 38 the maximum duration Toff_M of the OFF interval Toff is set equal to a normal interval Toff_NORM (of a duration longer than the minimum interval Ton_MIN), i.e., determined by the switching-control stage 12a on the basis of an ordinary control algorithm (for example, based upon: reaching of a valley value IL_val by the inductor current IL; a constant switching frequency; or a constant value for the OFF interval Toff, or for a product thereof with the output voltage Vout, in any case in a per se known manner and for this reason not described in detail herein). From step 37 and step 38, control passes to step 39, where the switching-control stage 12a waits for the maximum duration Toff_M of the OFF interval Toff to be reached, after which (step 40), the switching-control signal SW returns to the low value '0' and terminates the count of the OFF interval Toff. Control may thus return to step 30, for the next switching cycle. It should be noted that, in step 39, there may further possibly be envisioned modification of the maximum duration Toff_M of the OFF interval Toff in the case where the value of the output voltage Vout changes during the same OFF interval Toff (once again, according to what described previously).

Figure 3B:
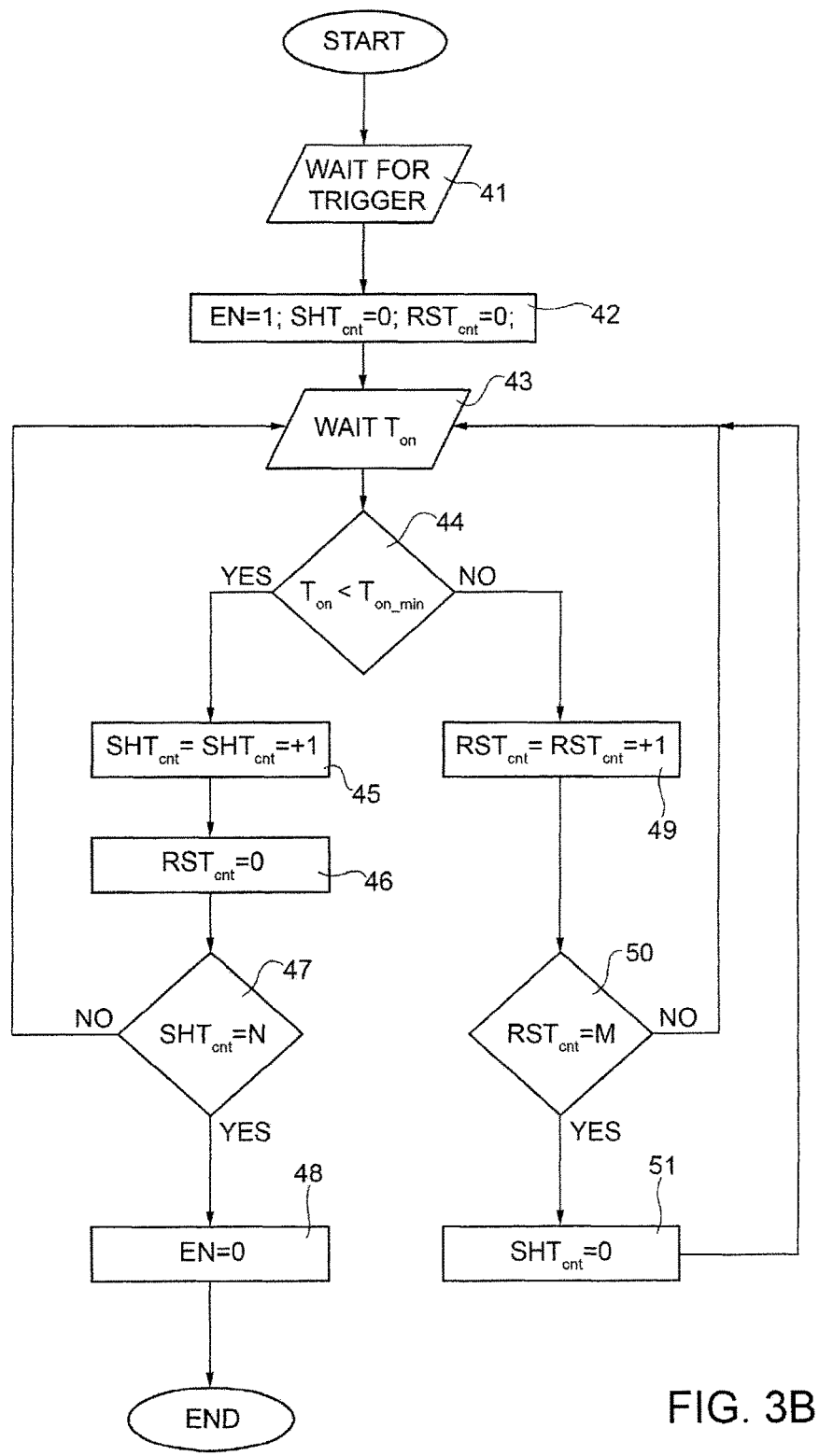

With reference to FIG. 3B, operation of the enabling-control stage 12b of the control unit 12 is now described. As mentioned previously, it is emphasized that the operations of the switching-control stage 12b proceed in parallel with the operations of the switching-control stage 12a, described previously with reference to FIG. 3A. In a preliminary step 41, the enabling-control stage 12b may possibly wait for arrival of an external enable signal, or trigger, for starting the operations.

In a step 42, the enable signal EN is assumed as being high ('1'). Further assumed as being equal to 0 (reset) are a short-circuit counter SHTcnt (indicating the number of consecutive switching cycles with minimum duration of the ON interval Ton) and a reset counter RSTcnt (indicating the number of consecutive switching cycles, with a duration of the ON interval Ton longer than the minimum interval Ton_MIN).

Next (step 43), the enabling-control stage 12b waits for measurement of the ON interval Ton, which is provided by the switching-control stage 12a. Next, in step 44, the enabling-control stage 12b compares the duration of the ON interval Ton with the minimum interval Ton_MIN.

In the case where the duration of the ON interval Ton is shorter than the minimum interval Ton_MIN, the short-circuit counter SHTcnt is incremented (step 45), and further the reset counter RSTcnt is reset (step 46). Then, in step 47, the enabling-control stage 12b checks whether the short-circuit counter SHTcnt is equal to the pre-set maximum number N of switching cycles.

If the condition SHTcnt=N is not satisfied, control returns to step 43, in order to wait for a new measurement of the ON interval Ton of the next switching cycle. If, instead, the condition SHTcnt=N is satisfied, control passes to step 48, where the enable signal EN is set to the low value, '0'. Enable signal EN, sent to the switching-control stage 12a thus determines turning-off of the voltage regulator 1, in so far as the presence of an effective stable condition of short-circuit at output has been determined.

If in step 44, it is instead found that the duration of the ON interval Ton is longer than or equal to the minimum interval Ton_MIN, in step 49 the reset counter RSTcnt is incremented (in so far as the presence of a switching cycle with a non-minimum duration of the ON interval Ton has been determined). Next, in step 50, the enabling-control stage 12b verifies whether the reset counter RSTcnt is equal to the pre-set number M of switching cycles.

If the condition RSTcnt=M is not satisfied, control returns to step 43 to wait for a new measurement of the ON interval Ton of the next switching cycle. If, instead, the condition RSTcnt=M is satisfied, control passes to step 51, where the short-circuit counter SHTcnt is reset (in so far as end of the short-circuit condition has been determined, or in any case it has been found that the short-circuit condition itself may not be considered stable). Also from step 51, control returns to step 43 to wait for a new measurement of the ON interval Ton of the next switching cycle. There now follows a more detailed description of the calculation of the lengthened interval Toff_LONG of the OFF interval Toff of the switching cycle by the control unit 12 of the control device 10.

Figure 4:
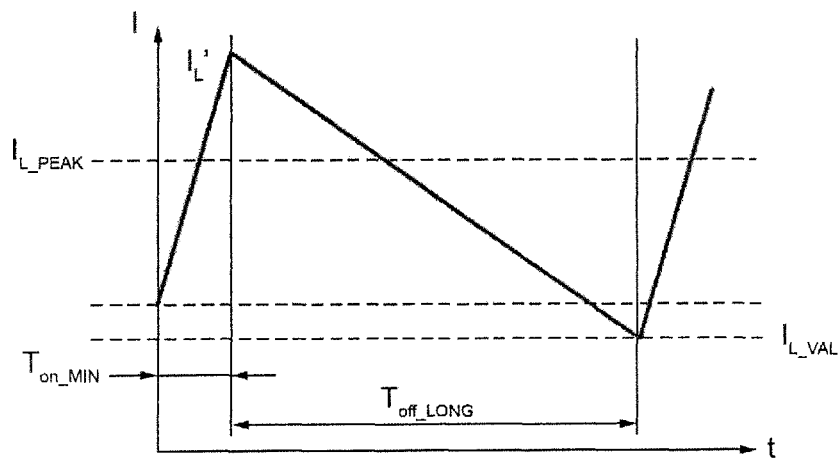
FIG. 4 is a diagram of an inductor current circulating in the voltage regulator of FIG. 2.

As shown in FIG. 4, in the case of a short-circuit, the inductor current IL increases during the ON interval Ton of minimum duration (Ton_MIN) up to a value IL higher than the maximum peak value IL_PEAK. Consequently, the control unit 12, following upon determination of the minimum duration of the ON interval Ton, appropriately lengthens the duration of the OFF interval Toff, which becomes equal to the lengthened interval Toff_LONG. At the end of this lengthened interval Toff_LONG, the inductor current IL is equal to a minimum valley value, designated by IL_val (which may be lower than a corresponding minimum value assumed in the normal operating condition).

The increase of the inductor current IL during the ON interval Ton of minimum duration is given by the following expression (where the voltage drop on the switch element 5 and the DC resistance of the inductor 7 are assumed negligible):

$$\Delta I_{L,Ton\_MIN} = \frac{V_{in} - V_{out}}{L} T_{on\_MIN}.$$

The decrease of the inductor current IL during the subsequent OFF interval Toff with lengthened duration is instead given by:

$$\Delta I_{L,Toff\_LONG} = \frac{V_{out} + V_f}{L} T_{off\_LONG}.$$

As noted out previously, the control unit 12 may determine the lengthened duration of the OFF interval Toff in such a way that the decrease of current during the OFF interval Toff will compensate the increase in current during the previous ON interval Ton, $\Delta I_{L,Ton\_MIN} = \Delta I_{L,Toff\_LONG}$:

$$\frac{V_{in} - V_{out}}{L} T_{on\_MIN} \leq \frac{V_{out} + V_f}{L} T_{off\_LONG}.$$

From this expression, the condition that has to be met for the lengthened interval Toff_LONG is obtained:

$$T_{off\_LONG} \geq \frac{V_{in} - V_{out}}{V_{out} + V_f} T_{on\_MIN}$$

which, in particular, is independent of the value of inductance L of inductor 7. The above expression may thus be used by the control unit 12 for determining the lengthened duration Toff_LONG of the OFF interval Toff.

For instance, considering a value for the input voltage Vin<60V, a voltage drop on the diode element Vf>0.3 V and a duration of the minimum interval Ton_MIN<0.3 μs, the following expression is obtained:

$$T_{off\_LONG} \geq \frac{60 - V_{out}}{V_{out} + 0.3} \cdot 0.3 \text{ μs}$$

which depends only on the short-circuit condition at output, i.e., on the value of the output voltage $V_{out}$.

Figure 5:
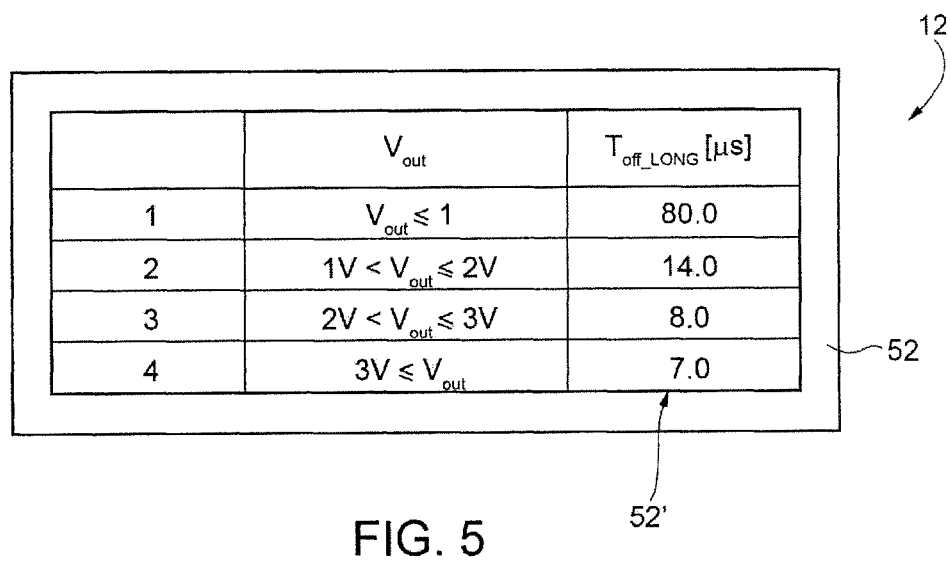
FIG. 5 is a chart of a memory and the corresponding contents in the control device of FIG. 2.

In particular, according to one aspect of the present approach and as represented schematically in FIG. 5, the control unit 12 is configured for storing, within a corresponding non-volatile memory 52, a table 52' that associates to values, or ranges of values, of the output voltage Vout, in the short-circuit condition, corresponding values of the lengthened interval Toff_LONG. It should be noted that represented in FIG. 5 are values provided by way of example, which refer to the previous numerical example. It should further be noted that, as the value of the output voltage Vout increases (more resistive short-circuit), the lengthened interval Toff_LONG shortens. A minimum value for the same lengthened interval Toff_LONG may thus be set, greater than or equal to the period corresponding to the updating frequency of the measurement of the output voltage Vout, provided, as mentioned previously, by the A/D converter stage 24.

Advantageously, during operation, by consulting the table 52', the switching-control stage 12a of the control unit 12, as a function of the detected value of the output voltage Vout, is thus able, in a short time and without any need to have available a high computational power, to determine an appropriate value for the lengthened interval Toff_LONG, at each switching cycle.

The advantages of the approach proposed are clear from the foregoing description. In any case, it is emphasized that this approach may enable both timely detection of a short-circuit situation and prevention of the destructive effects of the same short-circuit, in particular on the inductor 7 and on the switch element 5 of the voltage regulator 1.

In fact, instead of intervening once the inductor current IL has already reached critical levels, the approach disclosed envisions monitoring the evolution of the short-circuit phenomenon and prevention of the uncontrolled increase in the inductor current IL, thus perhaps eliminating the negative effects of a delayed intervention.

Figure 6A:
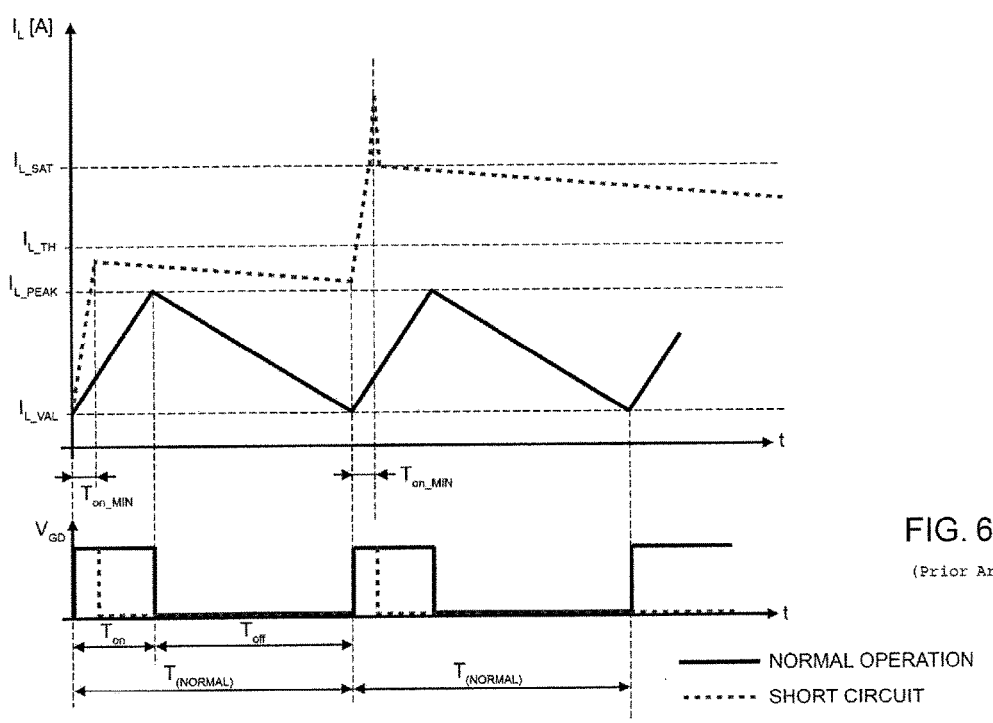
FIG. 6A is diagram of electrical signals in the voltage regulator of FIG. 1.

The above advantages are particularly evident from an examination and comparison of FIG. 6A (which refers to a typical approach) and 6B (which refers to the approach according to the embodiment of the present disclosure).

As shown in FIG. 6A, in a traditional approach, in the presence of a short-circuit (dashed line), the inductor current IL increases rapidly during the ON interval Ton and decreases very slowly during the subsequent OFF interval Toff (the plot regarding the normal operating condition is represented with a solid line in the same FIG. 6A). It follows that a limited number of switching cycles are sufficient (in the example two) for the inductor current IL to reach critical levels, in particular, for it to exceed the saturation level I_SAT of the inductor 7 (as indicated by the increase with a steep slope of the inductor current IL) before the voltage regulator 1 is turned off.

Figure 6B:
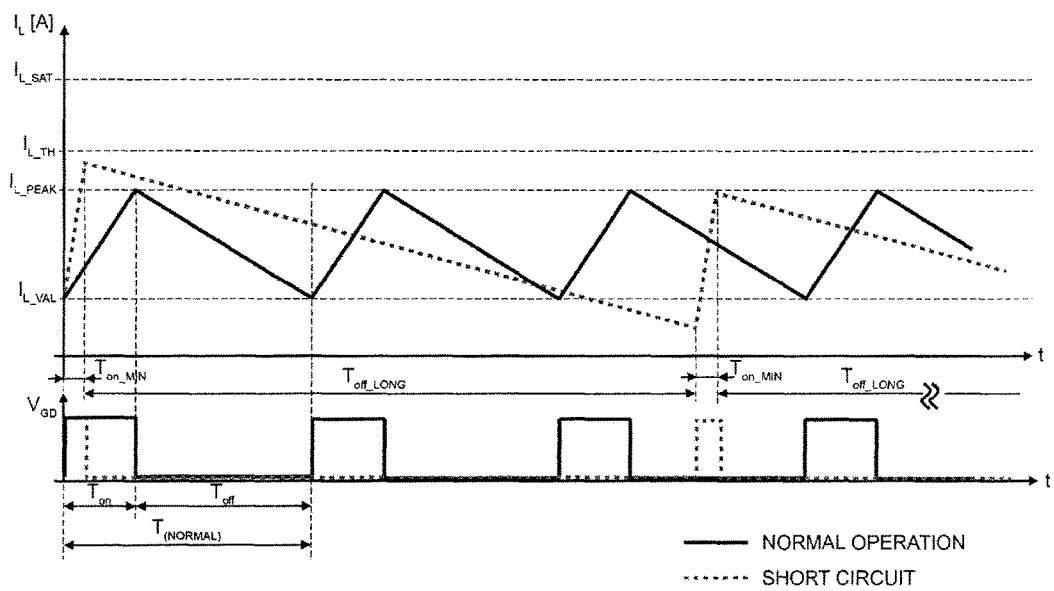
FIGS. 6B and 7 are diagrams of electrical signals in the voltage regulator of FIG. 2.

It should be noted that FIG. 6A regards a typical approach in which turning-off of the voltage regulator 1 is determined following upon exceeding, by the inductor current IL, of a current threshold I_TH higher than the peak value IL_PEAK. As shown in FIG. 6B, the approach disclosed herein prevents the inductor current IL from increasing in an uncontrolled way, above the saturation level I_SAT, thanks to the appropriate lengthening of the OFF interval Toff, which enables the inductor current IL to undergo a decrease in the lengthened interval Toff_LONG greater than or equal to the previous growth in the minimum value Ton_MIN of the ON interval Ton. In particular, in the example illustrated in FIG. 6B, the inductor current IL drops below the valley value IL_val at the end of OFF interval Toff.

Figure 7:
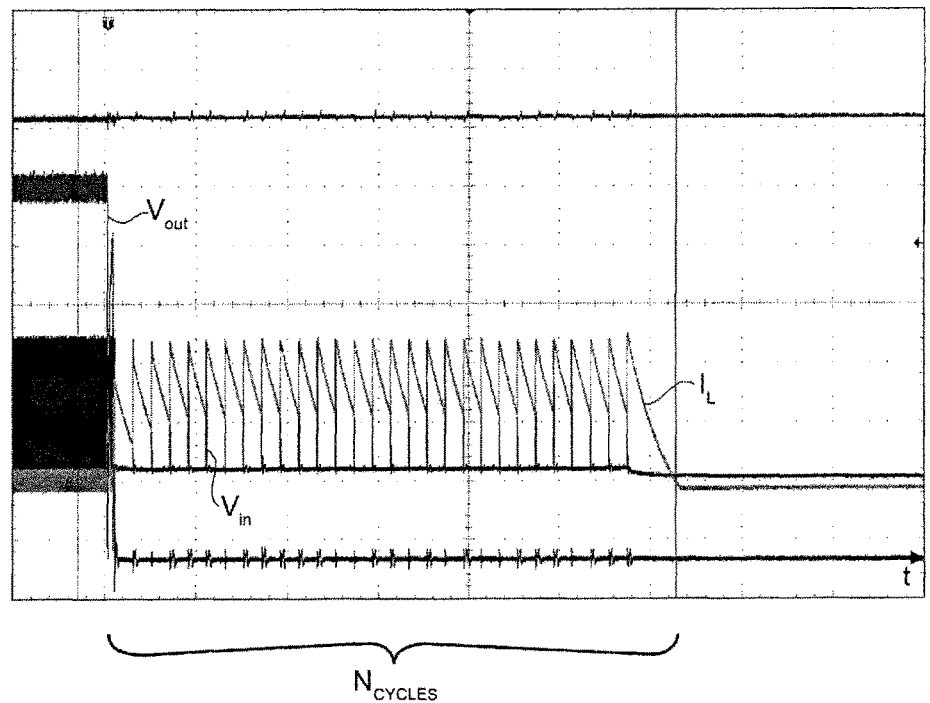

As shown in FIG. 7, which regards a test of effective operation of the voltage regulator 1, after a certain pre-set number N of switching cycles (where the minimum duration of the ON interval Ton is each time detected), the voltage regulator 1 is appropriately turned off in order to prevent stress to the circuit components (in the example, turning-off of the voltage regulator 1 occurs after approximately thirty-two switching cycles).

Figure 8:
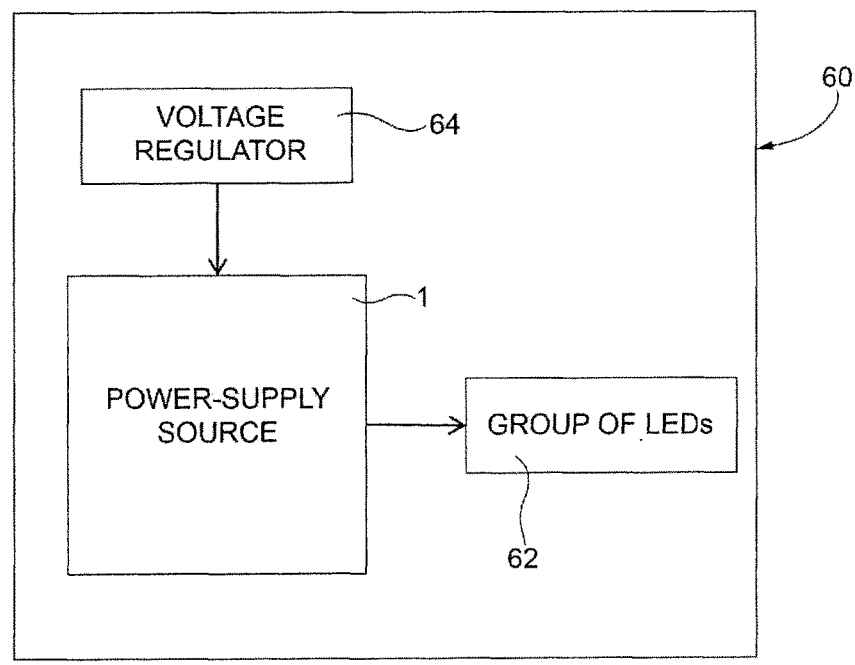
FIG. 8 is a schematic block diagram of an electronic apparatus including the voltage regulator of FIG. 2.

Advantageously, the approach disclosed herein does not entail substantial circuit modifications to the voltage regulator 1 and further involves a reduced computational power for implementing the control unit 12 of the control device 10. As is shown in FIG. 8, the voltage regulator 1 may thus be advantageously used within an electronic apparatus 60, for example, for driving a group of LEDs 62, being appropriately supplied by a supply source 64 internal to the electronic apparatus 60.

Finally, it is clear that modifications and variations may be made to what has been described and illustrated herein, without thereby departing from the scope of the present disclosure, as defined in the annexed claims. In particular, it is once more pointed out that, notwithstanding the fact that the foregoing description has made explicit reference to a buck regulator, the present approach may advantageously be applied also to other types of regulators, for example, flyback regulators, boost regulators, buck-boost regulators, or possible variations thereof. Again, it is emphasized that the regulator of the present approach may advantageously implement a voltage regulator or converter, to which the foregoing discussion has made explicit reference, by way of non-limiting example, or a current regulator or converter or, in general, an electric-power regulator or converter.

That which is claimed is:

1. A control device for controlling a voltage regulator, the control device comprising:
   a sensing stage coupled between a switch element and an inductor element; and
   a control unit coupled to the sensing stage and configured to:
   generate a control signal for controlling the switch element,
   determine a duration of an ON interval and a duration of an OFF interval at each of a plurality of switching cycles, wherein the duration of the ON interval corresponds to storage of energy in the inductor element starting from an input voltage, and wherein the duration of the OFF interval corresponds to transfer of energy stored in the inductor element into a storage element on which an output voltage is present,
   determine an end of the ON interval in a first switching cycle of the plurality of switching cycles, based upon a comparison between an inductor current that passes through the inductor element and a threshold value, and determine a first duration of the OFF interval in the first switching cycle,
   when the inductor current reaches the threshold value before the end of a first ON interval, determine the end of the ON interval at the end of the first ON interval, and
   following detection of the ON interval in a second switching cycle of the plurality of switching cycles having a duration equal to the first ON interval, determine the OFF interval having a second duration equal to a lengthened interval greater than the first duration, wherein a total duration of the ON interval and the OFF interval in the second switching cycle is greater than a total duration of the ON interval and the OFF interval in the first switching cycle.

2. The control device according to claim 1 wherein the control unit is configured to determine the lengthened interval based upon the output voltage.

3. The control device according to claim 1 wherein the control unit is configured to determine the lengthened interval so that a decrease in the inductor current during the OFF interval in the second switching cycle is greater than or equal to an increase of the inductor current during a previous ON interval, having a duration equal to the first ON interval.

4. The control device according to claim 3 wherein the inductor element is coupled between an internal node and an output terminal of the voltage regulator, the storage element being coupled to the output terminal; wherein the voltage regulator comprises a diode element coupled to the internal node; and wherein the control unit is configured to determine the lengthened interval based upon the formula:

$$T_{off\_LONG} \geq \frac{V_{in} - V_{out}}{V_{out} + V_f} T_{on\_MIN}$$

where Vin is a value of the input voltage, where Vout is a value of the output voltage, where Vf is a conduction voltage drop of the diode element, and where Ton_MIN is a duration of the first ON interval.

5. The control device according to claim 3 wherein the control unit is configured to determine the lengthened interval in accordance with the input voltage, the output voltage, a conduction voltage drop of a diode element, and a duration of the first ON interval.

6. The control device according to claim 1 further comprising a memory configured to store a table with a relation between values of the output voltage and values of the lengthened interval; and wherein the control unit is configured to detect a current value of the output voltage and retrieve from the table a corresponding value of the lengthened interval based upon the current value of the output voltage at each of a plurality of switching cycles.

7. The control device according to claim 1 wherein the control unit is configured to control turning-off of the voltage regulator based upon detection of a first number of switching cycles in the plurality of switching cycles, for which the ON interval has a duration equal to the first ON interval.

8. The control device according to claim 7 wherein the control unit is configured to reset a counter for counting the first number of switching cycles in the plurality of switching cycles when a second number of temporally consecutive switching cycles in the plurality of switching cycles, for which the ON interval has a duration greater than the first ON interval, is detected.

9. The control device according to claim 7 wherein the control unit comprises:

a switching-control stage configured to generate the control signal for controlling switching of the switch element; and an enabling-control stage configured to
operate simultaneously with and in parallel to the switching-control stage, and
supply to the switching-control stage an enable signal to cause turning-off of the voltage regulator based upon detection of the first number of switching cycles in the plurality of switching cycles.

10. The control device according to claim 9 wherein the switching-control stage and the enabling-control stage are defined by a finite-state machine (FSM).

11. An electronic device comprising:
a switch element; and
a control device comprising
a sensing stage to be coupled between the switch element and an inductor element; and
a control unit coupled to the sensing stage and configured to
generate a control signal for controlling the switch element,
determine a duration of an ON interval and a duration of an OFF interval at each of a plurality of switching cycles, wherein the duration of the ON interval corresponds to storage of energy in the inductor element starting from an input voltage, and wherein the duration of the OFF interval corresponds to transfer of energy stored in the inductor element into a storage element electrically coupled to the inductor element, on which an output voltage is present,
determine an end of the ON interval in a first switching cycle of the plurality of switching cycles, based upon a comparison between an inductor current that passes through the inductor element and a threshold value, and determine a first duration of the OFF interval in the first switching cycle,
when the inductor current reaches the threshold value before the end of a first ON interval, determine the end of the ON interval at the end of the first ON interval, and
following detection of the ON interval in a second switching cycle of the plurality of switching cycles having a duration equal to the first ON interval, determine the OFF interval having a second duration equal to a lengthened interval greater than the first duration, wherein a total duration of the ON interval and the OFF interval in the second switching cycle is greater than a total duration of the ON interval and the OFF interval in the first switching cycle.

12. The electronic device according to claim 11 wherein the control device is for a voltage regulator of a buck type; and wherein the output voltage comprises a direct current voltage less than the input voltage, the input voltage also comprising a DC voltage.

13. The electronic device according to claim 11 wherein the control unit is configured to determine the lengthened interval based upon the output voltage.

14. The electronic device according to claim 11 wherein control unit is configured to determine the lengthened interval so that a decrease in the inductor current during the OFF interval in the second switching cycle is greater than or equal to an increase of the inductor current during a previous ON interval, having a duration equal to the first ON interval.

15. The electronic device according to claim 14 wherein the inductor element is coupled between an internal node and an output terminal of a voltage regulator, the storage element being coupled to the output terminal; wherein the voltage regulator comprises a diode element coupled to the internal node; and wherein the control unit is configured to determine the lengthened interval based upon the formula:

$$T_{off\_LONG} \geq \frac{V_{in} - V_{out}}{V_{out} + V_f} T_{on\_MIN}$$

where Vin is a value of the input voltage, where Vout is a value of the output voltage, where Vf is a conduction voltage drop of the diode element, and where Ton_MIN is a duration of the first ON interval.

16. The electronic device according to claim 14 wherein the control unit is configured to determine the lengthened interval in accordance with the input voltage, the output voltage, a voltage drop of a diode element, and a duration of the first ON interval.

17. The electronic device according to claim 11 further comprising a memory configured to store a table with a relation between values of the output voltage and values of the lengthened interval; and wherein the control unit is configured to detect a current value of the output voltage and retrieve from the table a corresponding value of the lengthened interval based upon the current value of the output voltage at each switching cycle of the plurality of switching cycles.

18. The electronic device according to claim 11 wherein the electronic device comprises a voltage regulator.

19. A method for controlling a voltage regulator comprising a switch element, an inductor element coupled to the switch element, and a storage element electrically coupled to the inductor element, the method comprising:
generating a control signal for controlling the switch element;
determining a duration of an ON interval and a duration of an OFF interval at each of a plurality of switching cycles, wherein the duration of the ON interval corresponds to storage of energy in the inductor element starting from an input voltage, and wherein the duration of the OFF interval corresponds to transfer of energy stored in the inductor element into the storage element on which an output voltage is present;
determining an end of the ON interval in a first switching cycle of the plurality of switching cycles based upon a comparison between an inductor current that passes through the inductor element and a threshold value, and determining a first duration of the OFF interval in the first switching cycle;
when the inductor current reaches the threshold value before the end of a first ON interval, determining the end of the ON interval at the end of the first ON interval; and
following detection of the ON interval in a second switching cycle of the plurality of switching cycles having a duration equal to the first ON interval, determining the OFF interval having a second duration equal to a lengthened interval greater than the first duration, wherein a total duration of the ON interval and the OFF interval in the second switching cycle is greater than a total duration of the ON interval and the OFF interval in the first switching cycle.

20. The method according to claim 19 further comprising determining the lengthened interval based upon the output voltage.

21. The method according to claim 19 wherein determining the lengthened interval comprises determining so that a decrease in the inductor current during the OFF interval in the second switching cycle is greater than or equal to an increase of the inductor current during a previous ON interval, having a duration equal to the first ON interval.

22. The method according to claim 21 wherein the inductor element is coupled between an internal node and an output terminal of the voltage regulator, the storage element being coupled to the output terminal; wherein the voltage regulator comprises a diode element coupled to the internal node; and wherein determining the lengthened interval is based upon the formula:

$$T_{off\_LONG} \geq \frac{V_{in} - V_{out}}{V_{out} + V_f} T_{on\_MIN}$$

where Vin is a value of the input voltage, where Vout is a value of the output voltage, where Vf is a conduction voltage drop of the diode element, and where Ton_MIN is a duration of the first ON interval.

23. The method according to claim 21 wherein determining the lengthened interval is in accordance with the input voltage, the output voltage, a conduction voltage drop of a diode element, and a duration of the first ON interval.

24. The method according to claim 19 further comprising operating a memory to store a table with a relation between values of the output voltage and values of the lengthened interval; and further comprising detecting a current value of the output voltage and retrieving from the table a corresponding value of the lengthened interval based upon the current value of the output voltage at each switching cycle.

25. The method according to claim 19 further comprising controlling turning-off of the voltage regulator based upon detection of a first number of switching cycles, for which the ON interval has a duration equal to the first ON interval.

26. A control device for controlling a voltage regulator comprising a switch element, a diode element, an inductor element coupled to the switch element, and a storage element electrically coupled to the inductor element, the control device comprising:

a sensing stage coupled between the switch element and the inductor element; and a control unit coupled to said sensing stage and configured to:
generate a control signal for controlling the switch element,
determine at each switching, cycle alternation of an ON interval with storage of energy in the inductor element starting from an input voltage, and an OFF interval with transfer of energy stored in the inductor element into the storage element on which an output voltage is present,
determine an end of the ON interval based upon a comparison between an inductor current that passes through the inductor element and a first threshold value, and determine a first duration of the OFF interval,
when the inductor current reaches the first threshold value before the end of a first interval, determine the end of the ON interval at the end of the first interval, and
following detection of the ON interval having a duration equal to the first interval, the detection being indicative of a possible short-circuit condition at the storage element, determine the OFF interval having a second duration equal to a lengthened interval greater than the said first duration, wherein the lengthened interval is based upon the formula:

$$T_{off\_LONG} \geq \frac{V_{in} - V_{out}}{V_{out} + V_f} T_{on\_MIN}$$

where Vin is a value of the input voltage, where Vout is a value of the output voltage, where Vf is a conduction voltage drop of the diode element, and where Ton_MIN is the first interval of the ON interval.

27. The control device according to claim 26, wherein the inductor element is coupled between an internal node and an output terminal of the voltage regulator, the storage element being coupled to the output terminal, and wherein the diode element is coupled to the internal node.

* * * * *